US011939229B2

(12) United States Patent
Lin et al.

(10) Patent No.: US 11,939,229 B2
(45) Date of Patent: Mar. 26, 2024

(54) METHOD FOR TREATING COPPER-CONTAINING WASTE ETCHING SOLUTION

(71) Applicant: Central South University, Changsha (CN)

(72) Inventors: Zhang Lin, Changsha (CN); Xu Yan, Changsha (CN); Xueming Liu, Changsha (CN); Fandongkun Meng, Changsha (CN); Yanjie Liang, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 17/990,441

(22) Filed: Nov. 18, 2022

(65) Prior Publication Data

US 2023/0166979 A1    Jun. 1, 2023

Related U.S. Application Data

(63) Continuation of application No. PCT/CN2022/086882, filed on Apr. 14, 2022.

(30) Foreign Application Priority Data

Nov. 30, 2021    (CN) .......................... 202111444073.6

(51) Int. Cl.
*C01G 3/10*    (2006.01)
*C02F 1/52*    (2023.01)
(Continued)

(52) U.S. Cl.
CPC .................. *C01G 3/10* (2013.01); *C02F 9/00* (2013.01); *C01P 2004/03* (2013.01);
(Continued)

(58) Field of Classification Search
USPC .......................................................... 423/36
See application file for complete search history.

(56) References Cited

U.S. PATENT DOCUMENTS

2020/0385281 A1*  12/2020  Huang ................... A23K 20/30

FOREIGN PATENT DOCUMENTS

| CN | 101391800 A | * | 3/2009 |
| CN | 101391800 A |   | 3/2009 |

(Continued)

OTHER PUBLICATIONS

English translation of CN 102107978 A Description (Year: 2011).*

(Continued)

*Primary Examiner* — Anthony J Zimmer
*Assistant Examiner* — Zachary John Baum
(74) *Attorney, Agent, or Firm* — Nitin Kaushik

(57) ABSTRACT

The present invention provides a method for treating a copper-containing waste etching solution, which includes: preparing basic copper chloride nanometer seed crystals and synthesizing basic copper chloride mono-crystals; making an acidic waste etching solution subjected to agglomeration reaction with an ammonium-containing solution and slurry containing the basic copper chloride mono-crystals to obtain basic copper chloride crystal particles and copper-removed waste solution; making an alkaline waste etching solution react with sulfuric acid to obtain a copper sulfate mixed solution; and then evaporating, concentrating, cooling and crystallizing the copper sulfate mixed solution obtained by the reaction of the alkaline waste etching solution and the sulfuric acid in sequence to obtain copper sulfate pentahydrate solids. In a case of low investment, the present invention not only can realize the recycling of copper in the copper-containing waste etching solution, but also can

(Continued)

(a)

(b)

(c)

obtain various high-value products, and can achieve both environmental and economic benefits.

10 Claims, 3 Drawing Sheets

(51) Int. Cl.
  *C02F 1/66* (2023.01)
  *C02F 1/72* (2023.01)
  *C02F 9/00* (2023.01)
  *C02F 101/10* (2006.01)

(52) U.S. Cl.
  CPC .............. *C02F 1/5236* (2013.01); *C02F 1/66* (2013.01); *C02F 1/722* (2013.01); *C02F 2101/10* (2013.01)

(56) References Cited

FOREIGN PATENT DOCUMENTS

| CN | 102107978 | A | * | 6/2011 | | |
| CN | 102107978 | A | | 6/2011 | | |
| CN | 101948712 | B | * | 12/2012 | | |
| CN | 103351020 | A | * | 10/2013 | | |
| CN | 103351020 | A | | 10/2013 | | |
| CN | 105016373 | A | | 11/2015 | | |
| CN | 108249472 | A | | 7/2018 | | |
| CN | 108341424 | A | * | 7/2018 | ............... | C01G 3/10 |
| CN | 108341424 | A | | 7/2018 | | |
| CN | 108423704 | A | * | 8/2018 | ............... | C01G 3/05 |
| CN | 108423704 | A | | 8/2018 | | |
| CN | 110002490 | A | | 7/2019 | | |
| CN | 110158089 | A | * | 8/2019 | | |
| CN | 113584487 | A | * | 11/2021 | | |
| KR | 101149984 | B1 | * | 5/2012 | | |

OTHER PUBLICATIONS

English translation of CN 101391800 A Description (Year: 2009).*
English translation of CN 113584487 A Description (Year: 2021).*
English translation of CN 101948712 B Description (Year: 2012).*
Wolf, S. and Feldmann, C. "Cu2X(OH)3 (X = Cl-, NO3-): synthesis of nanoparticles and its application for room temperature deposition-printing of conductive copper thin-films." J. Mater. Chem., 2010,20, 7694-7699 (Year: 2010).*
English translation of CN 108423704 A Description (Year: 2018).*
English translation of CN 103351020 A Description (Year: 2013).*
English translation of CN 108341424 A Description (Year: 2018).*
English translation of KR 101149984 B1 Description (Year: 2012).*
English translation of CN 110158089 A Description (Year: 2019).*

* cited by examiner (a) (b) (c)
FIG. 1

METHOD FOR TREATING COPPER-CONTAINING WASTE ETCHING SOLUTION

CROSS-REFERENCE TO RELATED APPLICATIONS

The application claims priority to Chinese patent application No. CN202111444073.6, filed on Nov. 30, 2021, the entire contents of which are incorporated herein by reference.

TECHNICAL FIELD

The present invention relates to treatment of waste solutions, and more particularly relates to a method for treating a copper-containing waste etching solution.

BACKGROUND

With the development of electronic industry, the production of printed circuit boards has developed rapidly; at present, China has become a big producer of the printed circuit boards in the world; and more than 2.8 million tons of acidic copper chloride waste etching solution is produced from the production of the printed circuit boards every year, and the number is still increasing. In a process of printed circuit board processing, a large amount of copper-containing waste etching solution is produced, mainly including acidic waste etching solution and alkaline waste etching solution; and the acidic waste etching solution is mainly composed of $CuCl_2$, HCl and little $NH_4Cl$, and the alkaline waste etching solution is mainly composed of $NH_3 \cdot H_2O$, $[Cu(NH_3)_4]Cl_2$ and $NH_4Cl$. Thus it can be seen that the copper-containing waste etching solution has high pollution index; copper, chlorine ions and ammonium ions are listed as HW22 hazardous wastes in a national hazardous waste list; the direct emission of the copper-containing waste etching solution may cause extremely serious damage to the human environment; and it is especially noteworthy that trace copper can destroy organisms, while high concentration can cause cancer.

To solve the above problems, and to treat the copper-containing waste etching solution and avoid the harm of the copper in the waste etching solution to the environment, in the prior art, an electrolytic method, an extraction method and a neutralization precipitation method are often used to separate and purify the copper in the copper-containing waste etching solution, so that the copper in the copper-containing waste etching solution can be converted into copper sulfate, copper chloride, basic copper chloride and other copper salts, so as to effectively treat the copper-containing waste etching solution. However, the electrolytic method is complicated in process and large in investment; the extraction method needs to use expensive extraction agents and has complex processes; and the neutralization precipitation method obtains copper salt with poor quality, and is relatively high production cost. Therefore, the existing treatment method cannot treat the copper in the copper-containing waste etching solution with low cost and high benefit.

In view of this, it is necessary to provide a method for treating the copper-containing waste etching solution to solve or at least alleviate the defect that the copper-containing waste etching solution cannot be treated with low cost and high benefit.

SUMMARY

A main purpose of the present invention is to provide a method for treating a copper-containing waste etching solution, so as to solve the technical problem that the copper-containing waste etching solution cannot be treated with low cost and high benefit.

To realize the above purpose, the present invention provides a method for treating a copper-containing waste etching solution, which includes the following steps:

S1, preparing an inducer containing basic copper chloride nanometer seed crystals: mixing and curing a copper chloride solution and an ammonia solution in sequence to obtain the inducer containing the basic copper chloride nanometer seed crystals;

wherein a mixing temperature is 0-45° C., the mixing stirring speed is 750-1000 r/min, a concentration of copper ions in the copper chloride solution used in the mixing is 200-350 g/L, and an initial pH of the mixing is 1.0-3.0; a curing temperature is 35-60° C., and a curing duration is 8-48 h;

S2, preparing slurry containing basic copper chloride mono-crystals: making the inducer react with the copper chloride solution and the ammonia solution to obtain the slurry containing the basic copper chloride mono-crystals;

wherein a concentration of copper ions in the copper chloride solution used in the induced reaction is 25-75 g/L, an induced reaction temperature is 45-75° C., an initial pH of the induced reaction is 2.5-3.5, and a stirring speed of the induced reaction is 20-120 r/min;

S3, classifying the copper-containing waste etching solution for treatment: collecting the to-be-treated copper-containing waste etching solution, and classifying the copper-containing waste etching solution into an acidic waste etching solution and an alkaline waste etching solution;

S4, making the acidic waste etching solution to be subjected to agglomeration reaction with an ammonium-containing solution and the slurry containing the basic copper chloride mono-crystals to obtain basic copper chloride crystal particles and a copper-removed waste solution;

wherein an agglomeration reaction temperature is 80-100° C., an initial pH of the agglomeration reaction is 3.5-4.5, and a stirring speed of the agglomeration reaction is 150-300 r/min; and S5, making the alkaline waste etching solution react with sulfuric acid to obtain a copper sulfate mixed solution; and then evaporating, concentrating, cooling and crystallizing the copper sulfate mixed solution obtained by the reaction of the alkaline waste etching solution and the sulfuric acid to obtain copper sulfate pentahydrate solids.

Further, in the step S3, the acidic waste etching solution is classified into a low-impurity acidic waste etching solution and a high-impurity acidic waste etching solution, and the alkaline waste etching solution is classified into a low-impurity alkaline waste etching solution and a high-impurity alkaline waste etching solution;

wherein the low-impurity acidic waste etching solution is an acidic waste etching solution with an iron concentration less than 25 ppm, an aluminum concentration less than 5 ppm and an arsenic concentration less than 0.5 ppm; the high-impurity acidic waste etching solution is an acid waste etching solution satisfying one or more of the iron concentration greater than or equal to 25 ppm, the aluminum concentration greater than or equal to 5 ppm and the arsenic concentration greater than or equal to 0.5 ppm;

the low-impurity alkaline waste etching solution is an alkaline waste etching solution with the iron concentration less than 25 ppm, the aluminum concentration less than 5 ppm and the arsenic concentration less than 0.5 ppm; and the high-impurity alkaline waste etching solution is an alkaline waste etching solution satisfying one or more of the iron concentration greater than or equal to 25 ppm, the aluminum concentration greater than or equal to 5 ppm and the arsenic concentration greater than or equal to 0.5 ppm;

in the step S4, when the acidic waste etching solution is the low-impurity acidic waste etching solution, the ammonium-containing solution reacting with the low-impurity acidic waste etching solution comprises the low-impurity alkaline waste etching solution; and when the acidic waste etching solution is the high-impurity acidic waste etching solution, the ammonium-containing solution reacting with the high-impurity acidic waste etching solution comprises ammonia solution; and in the step S5, the alkaline waste etching solution is the high-impurity alkaline waste etching solution.

Further, when the acidic waste etching solution is the low-impurity acidic waste etching solution, the step S4 comprises adding the low-impurity acidic waste etching solution and the low-impurity alkaline waste etching solution in a parallel-flow manner into the slurry containing the basic copper chloride mono-crystals for first agglomeration reaction to obtain the basic copper chloride crystal particles and the copper-removed waste solution; and then filtering, washing and drying the basic copper chloride crystal particles obtained by the first agglomeration reaction in sequence to obtain basic copper chloride solids.

Further, the step S4 also comprises:

adding the ammonia solution into the basic copper chloride solids for alkaline dissolution to obtain copper hydroxide precipitates and an ammonium cupric chloride solution;

refluxing the ammonium cupric chloride solution into the low-impurity alkaline waste etching solution to take part in the first agglomeration reaction as the ammonium-containing solution together with the low-impurity alkaline waste etching solution; and making the copper hydroxide precipitates react with sulfuric acid to obtain the copper sulfate mixed solution; and then evaporating, concentrating, cooling and crystallizing the copper sulfate mixed solution obtained by the reaction of the copper hydroxide precipitates and the sulfuric acid to obtain copper sulfate pentahydrate solids.

Further, when the acidic waste etching solution is the high-impurity acidic etching solution, the step S4 comprises: removing impurities from the high-impurity acidic waste etching solution;

adding the ammonia solution with a concentration of 10 wt %-20 wt % and the high-impurity acidic waste etching solution after the impurity removal treatment in a parallel-flow manner into the slurry containing the basic copper chloride mono-crystals for second agglomeration reaction to obtain the basic copper chloride crystal particles and the copper-removed waste solution; and then filtering, washing and drying the basic copper chloride crystal particles obtained by the second agglomeration reaction in sequence to obtain basic copper chloride solids.

Further, an oxidant is used for removing the impurities from the high-impurity acidic waste etching solution.

Further, the step S4 also comprises: collecting a mixed solution of the basic copper chloride crystal particles and the copper-removed waste solution, and making the mixed solution of the basic copper chloride crystal particles and the copper-removed waste solution react with the ammonia solution and the sulfuric acid in sequence to obtain copper sulfate mixed solutions; and then evaporating, concentrating, cooling and crystallizing the copper sulfate mixed solutions obtained by the reactions of the mixed solution of the basic copper chloride crystal particles and the copper-removed waste solution and the ammonia solution and the sulfuric acid in sequence to obtain the copper sulfate pentahydrate solids.

Further, when the alkaline waste etching solution is the high-impurity alkaline waste etching solution, the step S5 also comprises: prior to the reaction between the high-impurity alkaline waste etching solution and the sulfuric acid, detoxifying the high-impurity alkaline waste etching solution.

Further, magnesium salt is used for detoxifying the high-impurity alkaline waste etching solution.

Further, a concentration of the ammonia solution in the step S1 is 20 wt %-30 wt %; and the concentration of the ammonia solution in the step S2 is 2.5 wt %-7.5 wt %.

Compared with the prior art, the present invention has the following advantages:

The method for treating the copper-containing waste etching solution provided by the present invention can complete the low-cost and high-benefit treatment of the copper-containing waste etching solution, and not only can realize the recycling of copper in the copper-containing waste etching solution, but also can obtain various high-value products, and can achieve both the environmental and economic benefits. Specifically, the inducer is prepared and used for induced synthesis of the basic copper chloride mono-crystals, and then the basic copper chloride mono-crystals are used as a base to separate the copper ions from the waste etching solution under the cooperation of the ammonia water, and the high-quality feed-grade basic copper chloride and the copper-removed waste solution are obtained, thereby reducing the harm to the environment; and in addition, the basic copper chloride obtained by the method has good mobility, dispersibility, long-term moisture resistance, hardening resistance and discoloration, and is a good feed additive; and moreover, the basic copper chloride obtained in the present invention can be converted into high-quality electroplating-grade copper sulfate after being treated. Moreover, the present invention also provides a targeted treatment way for the alkaline waste etching solution and especially for the high-impurity alkaline waste etching solution, so that the present invention can treat the waste etching solution more comprehensively, thereby improving the efficiency for treating the copper ions in the copper-containing waste etching solution, and obtaining non-toxic and harmless copper products and copper-removed waste solution.

DETAILED DESCRIPTION OF THE EMBODIMENTS

Figure 1:
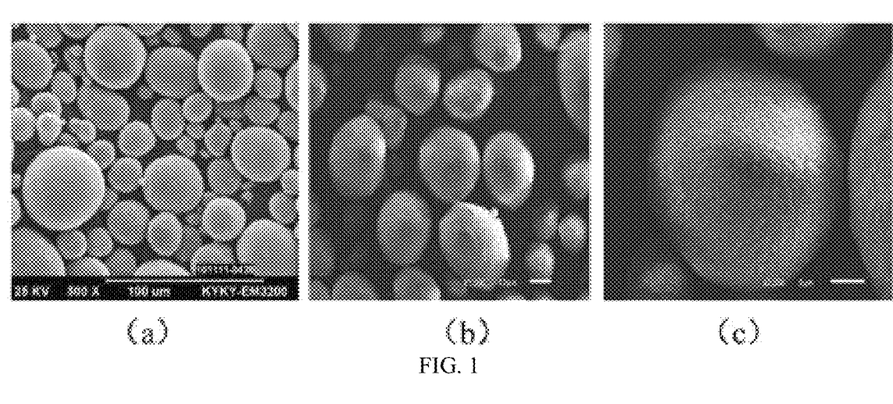
FIG. 1 is a scanning electron microscope image of basic copper chloride in embodiment 1 at different magnifications of the present invention, wherein (a) is a 500× scanning electron microscope image of the basic copper chloride; (b) is a 1000× scanning electron microscope image of the basic copper chloride; and (c) is a 3000× scanning electron microscope image of the basic copper chloride.

In order to treat a copper-containing waste etching solution, referring to FIG. 1, the present invention provides a method for treating the copper-containing waste etching solution, which includes the following steps:

S1, an inducer containing basic copper chloride nanometer seed crystals is prepared: a copper chloride solution and an ammonia solution are mixed and cured to obtain the inducer containing the basic copper chloride nanometer seed crystals.

The inducer is prepared by curing flocculent precipitates that are synthesized by mixing at high copper ion concentration, high stirring speed, low temperature and low pH value. The mixing temperature is 0-45° C., preferably 0-20° C.; the mixing stirring speed is 750-1000 r/min; a concentration of copper ions in the copper chloride solution used in the mixing is 200-350 g/L, preferably 250-350 g/L; an initial pH of the mixing is 1.0-3.0, preferably 1.5-2.0; a curing temperature is 35-60° C.; and a curing duration is 8-48 h.

It should be noted that the listed mixing conditions are conducive to the synthesis of the flocculent precipitates, thereby obtaining amorphous flocculent particles; and under the listed curing conditions, the amorphous flocculent particles may be converted into nanometer crystal particles, and the stirring may be unnecessary in the curing process.

S2, slurry containing the basic copper chloride mono-crystals is prepared: the inducer reacts with the copper chloride solution and the ammonia solution to promote crystal units separated out from the reaction solution to grow slowly on the nanometer seed crystals, thereby obtaining the slurry containing the basic copper chloride mono-crystals.

The basic copper chloride mono-crystals are synthesized by induction with basic copper chloride nanometer seed crystals, low copper ion concentration, low stirring speed, medium temperature and medium pH value, the synthesis time is generally 0.4-4 h, and the synthesis of the basic copper chloride mono-crystals may adopt water as a base solution; and an addition amount of the basic copper chloride nanometer seed crystals is 0.05%-3% (volume ratio) of an active volume of a reaction tank. Specifically, the concentration of copper ions in the copper chloride solution used in the induced reaction is 25-75 g/L, preferably 25-45 g/L; the induced reaction temperature is 45-75° C., preferably 45-60° C.; an initial pH of the induced reaction is 2.5-3.5; and a stirring speed of the induced reaction is 20-120 r/min, preferably 20-50 r/min.

It should be noted that in the step S2, on the basis of the existing induced seed crystals (basic copper chloride nanometer seed crystals), the growth of enantiomeric crystals with the same crystal form or stereo configuration may be accelerated or promoted, thereby promoting the newly generated crystal particles to be enriched on surfaces of the seed crystals, and making the basic copper chloride mono-crystals grow rapidly.

S3, the copper-containing waste etching solution is classified for treatment:

the to-be-treated copper-containing waste etching solution is collected, and the copper-containing waste etching solution is classified into an acidic waste etching solution and an alkaline waste etching solution.

S4, the acidic waste etching solution is subjected to an agglomeration reaction with an ammonium-containing solution and the slurry containing the basic copper chloride mono-crystals; and the small crystal particles are promoted to agglomerate on the large crystal particles, and the particles with the same size are agglomerated by collision, thereby forming polycrystals to obtain basic copper chloride crystal particles and a copper-removed waste solution.

In addition, because the copper after the reaction presents in a form of the basic copper chloride crystal particles, after simple separation, the copper-removed waste solution containing little copper may be obtained; and a basic copper chloride product in a spherical shape with uniform granularity and compact surface can be obtained.

The agglomeration reaction temperature is 80-100° C.; an initial pH of the agglomeration reaction is 3.5-4.5; and a stirring speed of the agglomeration reaction is 150-300 r/min.

It should be noted that the chemical formula of basic copper chloride is $Cu_2(OH)_3Cl$, and the acidic waste etching solution is mainly composed of $CuCl_2$, HCl and little $NH_4Cl$. By adding the ammonia solution, $CuCl_2$ may be converted into $Cu_2(OH)_3Cl$, i.e. basic copper chloride; and by adding the basic copper chloride mono-crystals, the mono-crystals may be promoted to be agglomerated into polycrystals, thereby forming large basic copper chloride crystal particles with higher density, more uniform granularity and more regular shape, so as to realize the high-efficiency treatment of the copper-containing waste etching solution.

S5, the alkaline waste etching solution reacts with sulfuric acid to obtain a copper sulfate mixed solution; and then the copper sulfate mixed solution obtained by the reaction of the alkaline waste etching solution and the sulfuric acid is evaporated, concentrated, cooled and crystallized in sequence to obtain copper sulfate pentahydrate solids.

It should be known that the alkaline waste etching solution is mainly composed of $NH_3 \cdot H_2O$, $[Cu(NH_3)_4]Cl_2$ and $NH_4Cl$; $[Cu(NH_3)_4]Cl_2$ may react with $H_2SO_4$ to obtain a copper sulfate mixed solution, and after the evaporation, concentration, cooling and crystallization, $CuSO_4 \cdot 5H_2O$ may be obtained.

In the above implementations, through the step S1 and the step S2, the slurry containing the basic copper chloride mono-crystals may be obtained; then the basic copper chloride mono-crystals are used as a base to separate the copper ions from the waste etching solution under the cooperation of the ammonia water, and the high-quality feed-grade basic copper chloride and the copper-removed waste solution are obtained, thereby reducing the harm to the environment; the basic copper chloride obtained by the method has good mobility, dispersibility, long-term moisture resistance, hardening resistance and discoloration, and is a good feed additive; and moreover, the basic copper chloride can also be converted into electroplating-grade copper sulfate with purity greater than 99% after being treated. In order to more comprehensively treat the waste etching solution, for the alkaline waste etching solution, a targeted treatment step is also given in the above implementations; and moreover, according to the operation of the step S5, not only can the copper in the alkaline waste etching solution be treated, but also the electroplating-grade copper sulfate can be obtained, so that the economic, social and environmental benefits are significant.

As a preferred solution of the above implementations, in the step S3, the acidic waste etching solution is classified into low-impurity acidic waste etching solution and high-impurity acidic waste etching solution; and the alkaline waste etching solution is classified into low-impurity alkaline waste etching solution and high-impurity alkaline waste etching solution.

The low-impurity acidic waste etching solution is an acidic waste etching solution with an iron concentration less than 25 ppm, an aluminum concentration less than 5 ppm and an arsenic concentration less than 0.5 ppm; the high-impurity acidic waste etching solution is an acidic waste etching solution satisfying one or more of iron concentration greater than or equal to 25 ppm, aluminum concentration greater than or equal to 5 ppm and arsenic concentration greater than or equal to 0.5 ppm; the low-impurity alkaline waste etching solution is an alkaline waste etching solution with the iron concentration less than 25 ppm, the aluminum concentration less than 5 ppm and the arsenic concentration less than 0.5 ppm; and the high-impurity alkaline waste etching solution is an alkaline waste etching solution satisfying one or more of iron concentration greater than or equal to 25 ppm, aluminum concentration greater than or equal to 5 ppm and arsenic concentration greater than or equal to 0.5 ppm.

As an option of the present implementation, in the step S4, when the acidic waste etching solution is the low-impurity acidic waste etching solution, the ammonium-containing solution reacting with the low-impurity acidic waste etching solution includes the low-impurity alkaline waste etching solution.

Based on this, the step S4 includes: the low-impurity acidic waste etching solution and the low-impurity alkaline waste etching solution are added in a parallel-flow manner into the slurry containing the basic copper chloride monocrystal for first agglomeration reaction to obtain the basic copper chloride crystal particles and copper-removed waste solution.

It should be clear that the low-impurity alkaline waste etching solution is used as the ammonium-containing solution, so that not only can the ammonia water in the low-impurity alkaline waste etching solution be used, but also the ammonium cupric chloride $[Cu(NH_3)_4]Cl_2$ in the low-impurity alkaline waste etching solution can be treated to make $[Cu(NH_3)_4]Cl_2$ react with HCl in the low-impurity acidic waste etching solution to obtain $CuCl_2$, so that $CuCl_2$ is further converted into the basic copper chloride crystal particles under the action of the ammonia water and the basic copper chloride mono-crystals.

As another option of the present implementation, in the step S4, when the acidic waste etching solution is the high-impurity acidic waste etching solution, the ammonium-containing solution reacting with the high-impurity acidic waste etching solution includes the ammonia solution.

Based on this, the step S4 includes: impurities of the high-impurity acidic waste etching solution are removed. The impurities are generally removed by adopting an oxidant, and the oxidant may be hydrogen peroxide. The impurity removal may be specifically as follows: the oxidant is added into the high-impurity acidic waste etching solution, and the pH is adjusted; the solution is stirred for period of time and then stands for layering; supernatant is collected and filtered; and the filtrate is collected, that is, the high-impurity acidic waste etching solution with the impurity removal treatment is obtained.

After the impurity removal treatment, the ammonia solution with a concentration of 10 wt %-20 wt % and the high-impurity acidic waste etching solution after the impurity removal treatment are added in a parallel-flow manner into the slurry containing the basic copper chloride mono-crystals for second agglomeration reaction to obtain the basic copper chloride crystal particles and the copper-removed waste solution.

Then, the basic copper chloride crystal particles obtained by the second agglomeration reaction are filtered, washed and dried in sequence to obtain basic copper chloride solids.

Although the basic copper chloride solids are already a product that can be used directly, in order to obtain copper sulfate pentahydrate solids, the ammonia solution may be added into the basic copper chloride solids for alkaline dissolution in some cases to obtain copper hydroxide precipitates and a ammonium cupric chloride solution; the copper hydroxide precipitates react with sulfuric acid to obtain a copper sulfate mixed solution; and then the copper sulfate mixed solution obtained by the reaction of the copper hydroxide precipitates and the sulfuric acid is evaporated, concentrated, cooled and crystallized in sequence to obtain the copper sulfate pentahydrate solids.

In order to avoid the pollution and waste of resources due to the dissolution of the copper ions, the ammonium cupric chloride solution may be refluxed to the low-impurity alkaline waste etching solution and take part in the first agglomeration reaction as an ammonium-containing solution together with the low-impurity alkaline waste etching solution so as to realize the effective treatment of the copper ions.

In order to obtain the copper sulfate pentahydrate solids, the mixed solution of the basic copper chloride crystal particles and the copper-removed waste solution may be collected, and the mixed solution of the basic copper chloride crystal particles and the copper-removed waste solution reacts with the ammonia solution and the sulfuric acid in sequence to obtain a copper sulfate mixed solution; and then the copper sulfate mixed solution obtained by the reaction of the mixed solution of the basic copper chloride crystal particles and the copper-removed waste solution and the ammonia solution and the sulfuric acid is evaporated, concentrated, cooled and crystallized in sequence to obtain the copper sulfate pentahydrate solids.

As a further option of the present implementation, in the step S5, the alkaline waste etching solution is a high-impurity alkaline waste etching solution. When the alkaline waste etching solution is the high-impurity alkaline waste etching solution, the step S5 also includes: prior to the reaction between the high-impurity alkaline waste etching solution and sulfuric acid, the high-impurity alkaline waste etching solution is detoxified. Specifically, magnesium salt may be used for detoxifying the high-impurity alkaline waste etching solution; and the magnesium salt may be a magnesium chloride solution. The detoxification may be specifically as follows: the magnesium salt is added into the high-impurity alkaline waste etching solution and stirred for a period of time and then stands for layering; supernatant is collected and filtered; and filtrate is collected, that is, the detoxified high-impurity alkaline waste etching solution is obtained.

As a supplementation of the above implementations, a concentration of the ammonia solution in the step S1 is 20 wt %-30 wt %; and the concentration of the ammonia solution in the step S2 is 2.5 wt %-7.5 wt %. After the basic copper chloride crystal particles are prepared, in a process of preparing the copper sulfate pentahydrate solids from the basic copper chloride crystal particles and the copper-removed waste solution or the basic copper chloride solids, the concentration of the used ammonia solution may be 20 wt %, the concentration of the sulfuric acid may be 98 wt %, and a ratio of the volume of the sulfuric acid to the mass of the copper hydroxide may be 0.3 L: 1 Kg.

To facilitate the further understanding of the present invention, examples are listed below for explanation:

Embodiment 1

The present invention provides a method for producing a high-value product from a copper-containing waste etching solution in various ways, which includes the following steps:

(1) Preparation of an inducer: 0.5 L of copper chloride solution containing 300 g/L of copper was collected and arranged into a 2 L beaker and then cooled to 25° C. in a cooler at a stirring speed of 800 r/min; 20% ammonia water was continuously added at a flow speed of 50 ml/min; when a pH value was about 2.0, light green flocculent precipitates were quickly formed in the solution; and then the solution was cured for 48 h at 40° C., and slurry finally turned green, which was referred to as seed slurry.

(2) Synthesis of basic copper chloride mono-crystals: 1 L of copper chloride waste etching solution containing 60 g/L of copper was prepared, and heated and kept at 60° C.; 1.5 L of 7.5% ammonia water was prepared, heated and kept at 60° C.; a 2.5 L beaker was used as a reactor, 200 ml of deionized water was added as a base solution, heated and kept at 60° C., and a stirring speed was 50 r/min; 2 ml of seed slurry was added first, then the copper-containing copper chloride solution and the ammonia water were added in a parallel-flow manner; the addition speed of the ammonia water was 10 ml/min, and the pH value during the synthesis was kept at about 3; and when a volume in the reactor was 1.2 L, the addition was stopped, and the temperature was kept for 0.5 h. The color of the slurry in the reactor was grass green.

Figure 2:
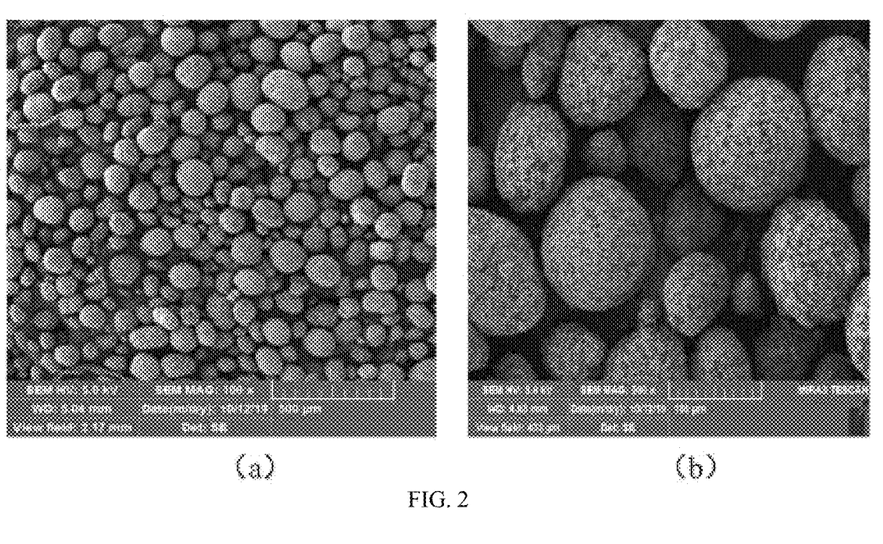
FIG. 2 is a scanning electron microscope image of copper hydroxide in embodiment 1 at different magnifications of the present invention, wherein (a) is a 100× scanning electron microscope image of the copper hydroxide; and (b) is a 500× scanning electron microscope image of the copper hydroxide.

(3) Production of basic copper chloride from low-impurity acidic waste etching solution and low-impurity alkaline waste etching solution: 1 L of low-impurity acidic waste etching solution and 1.5 L of low-impurity alkaline waste etching solution were collected, heated and kept at 85° C.; 1.2 L of slurry in the step (2) was heated to 85° C., and the stirring speed increased to 150 r/min; the acidic and alkaline waste etching solutions were added in a parallel-flow manner; the addition speed of the alkaline waste etching solution was 15 ml/min, and the addition speed of the acidic waste etching solution was 10 ml/min; the pH value during the synthesis was kept at about 4; and when the volume in the reactor was 2.0 L, the addition was stopped, and the temperature was kept for 2 h. The color of the slurry in the reactor was still grass green, but the color was darkened slightly. The slurry was filtered, washed and dried to obtain the basic copper chloride product. As shown in FIG. 2, the basic copper chloride is spherical in shape and compact in surface, and has the characteristics of good mobility and no moisture absorption.

(4) Production of copper sulfate from the low-impurity acidic waste etching solution and low-impurity alkaline waste etching solution: ammonia water was added into the basic copper chloride obtained in the step (3) for alkaline dissolution; a ratio of the volume of the added ammonia water to the mass of the basic copper chloride was 1.3 L: 1 Kg; the reaction was basically ended after 30 min; and the obtained product was subjected to solid-liquid separation to obtain the copper hydroxide precipitates and an ammonia water mixed solution.

Figure 3:
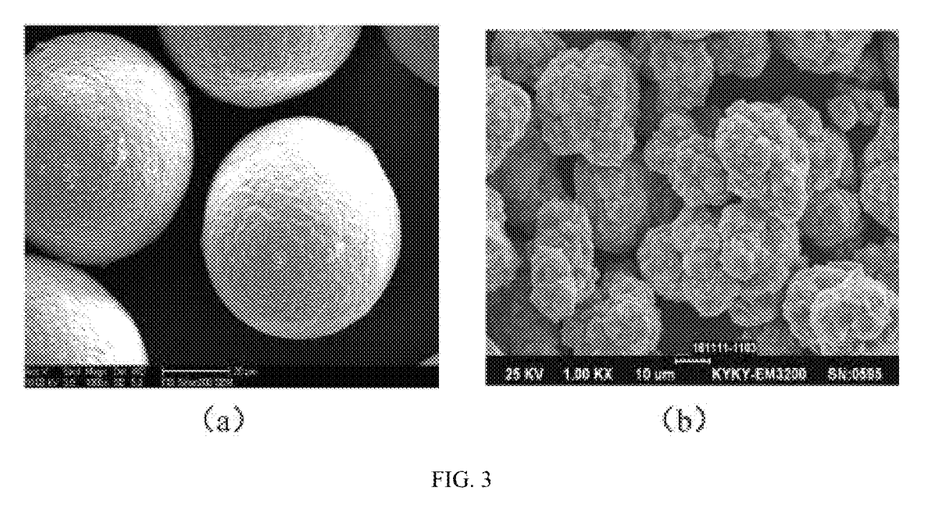
FIG. 3 is a scanning electron microscope contrast image of the basic copper chloride in embodiment 1 and in a comparative example 1 of the present invention; (a) is a 1000× scanning electron microscope image of the basic copper chloride obtained in the embodiment 1; and (b) is a 1000× scanning electron microscope image of the basic copper chloride obtained in the comparative example 1.

As shown in FIG. 3, crystals of the crystalline copper hydroxide are well developed; and compared with amorphous or semi-crystalline copper hydroxide, the crystalline copper hydroxide has the characteristics of less impurity content and high stability, which creates conditions for producing high-value copper sulfate intermediates. 98% concentrated sulfuric acid was slowly added into the copper hydroxide for acidification; the pH value during the reaction was controlled at about 2.5; the reaction temperature was about 85° C.; the copper hydroxide was dissolved by continuously stirring; after the acidification was completed, the product was cooled to 40° C. to separate out the copper sulfate crystals; then the copper sulfate product was obtained by solid-liquid separation and dehydration drying; and the obtained copper sulfate was uniform in granularity, dry, less susceptible to caking, and conducive to long-term storage.

Comparative Example 1

1 L of copper chloride waste etching solution containing 60 g/L of copper was prepared in a simulation manner by adopting copper chloride as a raw material, and heated and kept at 85° C.; 1.5 L of 7.5% ammonia water was prepared, heated and kept at 85° C.; a 2.5 L beaker was used as a reactor; 200 ml of deionized water was added as a base solution, heated and kept at 85° C., and a stirring speed was 150 r/min; the copper chloride waste etching solution and the ammonia water were added in a parallel-flow manner; the addition speed of each of the copper chloride waste etching solution and the ammonia water was 10 ml/min; the pH value during the synthesis was kept at about 4; and when the volume in the reactor was 2.0 L, the addition was stopped, and the temperature was kept for 2 h. The color of the slurry in the reactor was black green. The slurry was filtered, washed and dried to obtain the product; and the product was non-uniform in granularity and uneven in surface.

As shown in FIG. 4, it may be known from the comparison between the embodiment 1 and the comparative example 1 that the shape and granularity of the basic copper chloride solids obtained in the embodiment 1 are apparently better than the basic copper chloride solids obtained in the comparative example 1; and the size of the basic copper chloride solids in the embodiment 1 is also greater than the basic copper chloride solids in the comparative example 1. Therefore, it shows that the addition of the basic copper chloride mono-crystal plays an important role in the formation of basic copper chloride crystal particles, and can convert the copper ions in the copper-containing waste etching solution into high-value feed-grade basic copper chloride. By taking the basic copper chloride crystal particles obtained in the embodiment 1 as a base, the copper hydroxide with better crystal form can be obtained, so that the high-quality copper sulfate solids can be obtained.

For other explanations of an implementation form of the present invention, refer to embodiments 2-5.

Embodiment 2

(1) Preparation of the inducer: same as embodiment 1.
(2) Synthesis of basic copper chloride mono-crystals: Same as embodiment 1.
(3) Production of basic copper chloride from low-impurity acidic waste etching solution and low-impurity alkaline waste etching solution: 1 L of low-impurity acidic waste etching solution and 1.5 L of alkaline waste etching solution were collected, heated and kept at 85° C.; 1.2 L of slurry in the step (2) was heated to 100° C., and the stirring speed increased to 150 r/min; the acidic and alkaline waste etching solutions were added in a parallel-flow manner; the addition speed of the alkaline waste etching solution was 15 ml/min, the addition speed of the acidic waste etching solution was 10 ml/min, and the pH value during the synthesis was kept at about 4; and when the volume in the reactor was 2.0 L, the addition was stopped, and the temperature was kept for 2 h. The color of the slurry in the reactor was still grass green, but the color was darkened slightly. The slurry was filtered, washed and dried to obtain the basic copper chloride product.
(4) Production of copper sulfate from the low-impurity acidic waste etching solution and low-impurity alkaline waste etching solution: ammonia water was added into the basic copper chloride obtained in the step (3) for alkaline dissolution; a ratio of the volume of the added ammonia water to the mass of the basic copper chloride was 1.4 L: 1 Kg; the reaction was basically ended after 30 min; and the obtained product was subjected to solid-liquid separation to obtain the copper hydroxide precipitates and the ammonia water mixed solution. 98% concentrated sulfuric acid was slowly added into the copper hydroxide for acidification; the pH value during the reaction was controlled at about 2.5; the reaction temperature was about 100° C.; the copper hydroxide was dissolved by continuously stirring; after the acidification was completed, the product was cooled to 40° C. to separate out the copper sulfate crystals; and then the copper sulfate product was obtained by solid-liquid separation and dehydration drying. The copper sulfate obtained by the method is uniform in granularity, dry, less susceptible to caking, and conducive to long-term storage.

Embodiment 3

(1) Preparation of the inducer: same as embodiment 1.
(2) Synthesis of basic copper chloride mono-crystals: same as embodiment 1.
(3) Production of basic copper chloride from high-impurity acidic waste etching solution: 1 L of high-impurity acidic waste etching solution was collected; hydrogen peroxide was added into the high-impurity acidic waste etching solution; the pH value of the solution was adjusted to 4.5; the solution stood for 20 min and was then filtered; filtrate was collected, heated and kept at 85° C.; 1.5 L of 20% ammonia water was prepared, heated and kept at 85° C.; 1.2 L of slurry in the step (2) was heated to 85° C.; the stirring speed increased to 150 r/min; the acidic waste etching solution and the ammonia water were added in a parallel-flow manner; the addition speed of the ammonia water was 15 ml/min, the addition speed of the acidic waste etching solution was 10 ml/min, and the pH value during the synthesis was kept at about 4; and when the volume in the reactor was 2.0 L, the addition was stopped, and the temperature was kept for 2 h. The color of the slurry in the reactor was still grass green, but the color was darkened slightly. The slurry was filtered, washed and dried to obtain the basic copper chloride product.
(4) Production of copper sulfate from the high-impurity acidic waste etching solution: ammonia water was added into the basic copper chloride obtained in the step (3) for alkaline dissolution; a ratio of the volume of the added ammonia water to the mass of the basic copper chloride was 1.3 L: 1 Kg; the reaction was basically ended after 30 min; and the obtained product was subjected to solid-liquid separation to obtain the copper hydroxide precipitates and the ammonia water mixed solution. 98% concentrated sulfuric acid was slowly added into the copper hydroxide for acidification; the pH value during the reaction was controlled at about 2.5; the reaction temperature was about 100° C.; the copper hydroxide was dissolved by continuously stirring; after the acidification was completed, the product was cooled to 40° C. to separate out the copper sulfate crystals; and then the copper sulfate product was obtained by solid-liquid separation and dehydration drying.

Embodiment 4

(1) Preparation of the inducer: same as embodiment 1.
(2) Synthesis of basic copper chloride mono-crystals: 1 L of copper chloride waste etching solution containing 60 g/L of copper was prepared, heated and kept at 60° C.; 1.5 L of 7.5% ammonia water was prepared, heated and kept at 60° C.; a 2.5 L beaker was used as a reactor; 200 ml of deionized water was added as a base solution, heated and kept at 60° C., and a stirring speed was 50 RPM; 1.0 ml of seed slurry was added first, and then the copper-containing copper chloride solution and the ammonia water were added in a parallel-flow manner; the addition speed of the ammonia water was 10 ml/min, and the pH value during the synthesis was kept at about 3; and when the volume in the reactor was 1.2 L, the addition was stopped, and the temperature was kept for 0.5 h. The color of the slurry in the reactor was grass green.
(3) Production of basic copper chloride from high-impurity acidic waste etching solution: 1 L of high-impurity acidic waste etching solution was collected; hydrogen peroxide was added into the high-impurity acidic waste etching solution; the pH value of the solution was adjusted to 3.5; the solution stood for 20 min and was then filtered; filtrate was collected, heated and kept at 85° C.; 1.5 L of 15% ammonia water was prepared, heated and kept at 85° C.; 1.2 L of slurry in the step (2) was heated to 85° C.; the stirring speed increased to 150 r/min; the acidic waste etching solution and the ammonia water were added in a parallel-flow manner; the addition speed of the ammonia water was 15 ml/min, the addition speed of the acidic waste etching solution was 10 ml/min, and the pH value during the synthesis was kept at about 4; and when the volume in the reactor was 2.0 L, the addition was stopped, and the temperature was kept for 2 h. The color of the slurry in the reactor was still grass green, but the color was darkened slightly. The slurry was filtered, washed and dried to obtain the basic copper chloride product.
(4) Production of copper sulfate from the high-impurity acidic waste etching solution: ammonia water was added into the basic copper chloride obtained in the step (3) for alkaline dissolution; a ratio of the volume of the added ammonia water to the mass of the basic copper chloride was 1.3 L: 1 Kg; the reaction was basically ended after 30 min; and the obtained product was subjected to solid-liquid separation to obtain the copper hydroxide precipitates and the ammonia water mixed solution. 98% concentrated sulfuric acid was slowly added into the copper hydroxide for acidification; the pH value during the reaction was controlled at about 2.5; the reaction temperature was about 85° C.; the copper hydroxide was dissolved by continuously stirring; after the acidification was completed, the product was cooled to 40° C. to separate out the copper sulfate crystals; and then the copper sulfate product was obtained by solid-liquid separation and dehydration drying.

Embodiment 5

(1) Preparation of the inducer: 0.5 L of copper chloride solution containing 260 g/L of copper was collected and arranged into a 2 L beaker and then cooled to 5° C. in a cooler; 20% ammonia water was continuously added at a flow speed of 40 ml/min at a stirring speed of 800 r/min; when the pH value was about 3.0, light green flocculent precipitates were quickly formed in the solution; and then the solution was cured for 36 h at 50° C., and slurry finally turned medium green, and the slurry was referred to as seed slurry.

(2) Synthesis of basic copper chloride mono-crystals: 1 L of copper chloride waste etching solution containing 40 g/L of copper was prepared, heated and kept at 70° C.; 1.5 L of 5.0% ammonia water was prepared, heated and kept at 70° C.; a 2.5 L beaker was used as a reactor; 200 ml of deionized water was added as a base solution, heated and kept at 70° C., and a stirring speed was 40 r/min; 0.5 ml of seed slurry was added first; then the copper-containing copper chloride solution and the ammonia water were added in a parallel-flow manner; the addition speed of the ammonia water was 15 ml/min, and the pH value during the synthesis was kept at about 3.5; and when the volume in the reactor was 1.2 L, the addition was stopped, and the temperature was kept for 2 h. The color of the slurry in the reactor was grass green.

(3) Production of basic copper chloride from high-impurity acidic waste etching solution: 1 L of high-impurity acidic waste etching solution was collected; hydrogen peroxide was added into the high-impurity acidic waste etching solution; the pH value of the solution was adjusted to 3.5; the solution stood for 20 min and was then filtered; filtrate was collected, heated and kept at 95° C.; 1.5 L of 15% ammonia water was prepared, heated and kept at 95° C.; 1.2 L of slurry in the step (2) was heated to 95° C.; the stirring speed was increased to 200 r/min; the acidic waste etching solution and the ammonia water were added in a parallel-flow manner; the addition speed of the ammonia water was 10 ml/min, the addition speed of the acidic waste etching solution was 10 ml/min, and the pH value during the synthesis was kept at about 3.5; and when the volume in the reactor was 2.0 L, the addition was stopped, and the temperature was kept for 4 h. The color of the slurry in the reactor was still grass green, but the color was darkened slightly. The slurry was filtered, washed and dried to obtain the basic copper chloride product.

(4) Production of copper sulfate from high-impurity alkaline waste etching solution: 1.5 L of alkaline waste etching solution was collected; a magnesium chloride solution was added into the alkaline waste etching solution; the mixed solution was stirred uniformly, stood for 20 min, and was filtered; the filtrate was collected, heated and kept at 95° C.; 98% concentrated sulfuric acid was slowly added into the alkaline waste etching waste solution for acidification; the pH value during the reaction was controlled at about 2.5; the reaction temperature was about 85° C., and the stirring continued; after the acidification was completed, the product was cooled to 40° C. to separate out the copper sulfate crystals; and then the copper sulfate product was obtained by solid-liquid separation and dehydration drying.

What is claimed is:

1. A method for treating a copper-containing waste etching solution, comprising steps:
    S1, preparing an inducer containing basic copper chloride nanometer seed crystals: mixing and curing a copper chloride solution and an ammonia solution in a sequence to obtain the inducer containing the basic copper chloride nanometer seed crystals;
    wherein a mixing temperature is 0-45° C., a mixing stirring speed is 750-1000 r/min, a concentration of copper ions in the copper chloride solution used in the mixing is 200-350 g/L, and an initial pH of the mixing is 1.0-3.0; a curing temperature is 35-60° C., and a curing duration is 8-48 h;
    S2, preparing a slurry containing basic copper chloride mono-crystals: making the inducer react with the copper chloride solution and the ammonia solution to obtain the slurry containing the basic copper chloride mono-crystals;
    wherein a concentration of copper ions in the copper chloride solution used in an induced reaction is 25-75 g/L, an induced reaction temperature is 45-75° C., an initial pH of the induced reaction is 2.5-3.5, and a stirring speed of the induced reaction is 20-120 r/min;
    S3, classifying the copper-containing waste etching solution for treatment: collecting a to-be-treated copper-containing waste etching solution, and classifying the copper-containing waste etching solution into an acidic waste etching solution and an alkaline waste etching solution;
    S4, making the acidic waste etching solution to be subjected to an agglomeration reaction with an ammonium-containing solution and the slurry containing the basic copper chloride mono-crystals to obtain basic copper chloride crystal particles and a copper-removed waste solution;
    wherein an agglomeration reaction temperature is 80-100° C., an initial pH of the agglomeration reaction is 3.5-4.5, and a stirring speed of the agglomeration reaction is 150-300 r/min; and
    S5, making the alkaline waste etching solution react with sulfuric acid to obtain a copper sulfate mixed solution; and then evaporating, concentrating, cooling and crystallizing the copper sulfate mixed solution obtained by the reaction of the alkaline waste etching solution and the sulfuric acid to obtain copper sulfate pentahydrate solids.

2. The method according to claim 1, wherein in the step S3, the acidic waste etching solution is classified into a low-impurity acidic waste etching solution and a high-impurity acidic waste etching solution, and the alkaline waste etching solution is classified into a low-impurity alkaline waste etching solution and a high-impurity alkaline waste etching solution;
    wherein the low-impurity acidic waste etching solution is an acidic waste etching solution with an iron concentration less than 25 ppm, an aluminum concentration less than 5 ppm and an arsenic concentration less than 0.5 ppm; the high-impurity acidic waste etching solution is an acid waste etching solution satisfying one or more of the iron concentration greater than or equal to 25 ppm, the aluminum concentration greater than or equal to 5 ppm and the arsenic concentration greater than or equal to 0.5 ppm; the low-impurity alkaline waste etching solution is an alkaline waste etching solution with the iron concentration less than 25 ppm, the aluminum concentration less than 5 ppm and the arsenic concentration less than 0.5 ppm; and the high-impurity alkaline waste etching solution is an alkaline waste etching solution satisfying one or more of the iron concentration greater than or equal to 25 ppm, the aluminum concentration greater than or equal to 5 ppm and the arsenic concentration greater than or equal to 0.5 ppm;

in the step S4, when the acidic waste etching solution is the low-impurity acidic waste etching solution, the ammonium-containing solution reacting with the low-impurity acidic waste etching solution comprises the low-impurity alkaline waste etching solution; and when the acidic waste etching solution is the high-impurity acidic waste etching solution, the ammonium-containing solution reacting with the high-impurity acidic waste etching solution comprises the ammonia solution; and in the step S5, the alkaline waste etching solution is the high-impurity alkaline waste etching solution.

3. The method according to claim 2, wherein when the acidic waste etching solution is the low-impurity acidic waste etching solution, the step S4 comprises adding the low-impurity acidic waste etching solution and the low-impurity alkaline waste etching solution in a parallel-flow manner into the slurry containing the basic copper chloride mono-crystals for a first agglomeration reaction to obtain the basic copper chloride crystal particles and the copper-removed waste solution; and then filtering, washing and drying the basic copper chloride crystal particles obtained by the first agglomeration reaction in the sequence to obtain basic copper chloride solids.

4. The method according to claim 3, wherein the step S4 also comprises:

adding the ammonia solution into the basic copper chloride solids for alkaline dissolution to obtain copper hydroxide precipitates and an ammonium cupric chloride solution;

refluxing the ammonium cupric chloride solution into the low-impurity alkaline waste etching solution to take part in the first agglomeration reaction as the ammonium-containing solution together with the low-impurity alkaline waste etching solution; and making the copper hydroxide precipitates react with sulfuric acid to obtain a copper sulfate mixed solution; and then evaporating, concentrating, cooling and crystallizing the copper sulfate mixed solution obtained by the reaction of the copper hydroxide precipitates and the sulfuric acid to obtain copper sulfate pentahydrate solids.

5. The method according to claim 2, wherein when the acidic waste etching solution is the high-impurity acidic etching solution, the step S4 comprises:

removing impurities from the high-impurity acidic waste etching solution;

adding the ammonia solution and the high-impurity acidic waste etching solution after an impurity removal treatment in a parallel-flow manner into the slurry containing the basic copper chloride mono-crystals for a second agglomeration reaction to obtain the basic copper chloride crystal particles and the copper-removed waste solution, wherein a concentration of the ammonia solution added with the high-impurity acidic waste etching solution is 10 wt %-20 wt %; and then filtering, washing and drying the basic copper chloride crystal particles obtained by the second agglomeration reaction in the sequence to obtain basic copper chloride solids.

6. The method according to claim 5, wherein an oxidant is used for removing the impurities from the high-impurity acidic waste etching solution.

7. The method according to claim 5, wherein the step S4 also comprises: collecting a mixed solution of the basic copper chloride crystal particles and the copper-removed waste solution, and making the mixed solution of the basic copper chloride crystal particles and the copper-removed waste solution react with the ammonia solution and sulfuric acid in the sequence to obtain copper sulfate mixed solutions; and then evaporating, concentrating, cooling and crystallizing the copper sulfate mixed solutions obtained by reactions of the mixed solution of the basic copper chloride crystal particles and the copper-removed waste solution and the ammonia solution and the sulfuric acid in the sequence to obtain the copper sulfate pentahydrate solids.

8. The method according to claim 2, wherein when the alkaline waste etching solution is the high-impurity alkaline waste etching solution, the step S5 also comprises: prior to the reaction between the high-impurity alkaline waste etching solution and the sulfuric acid, detoxifying the high-impurity alkaline waste etching solution.

9. The method according to claim 8, wherein magnesium salt is used for detoxifying the high-impurity alkaline waste etching solution.

10. The method according to claim 1, wherein a concentration of the ammonia solution in the step S1 is 20 wt %-30 wt %; and the concentration of the ammonia solution in the step S2 is 2.5 wt %-7.5 wt %.

* * * * *